W. C. ANTHONY AND M. HEINEMANN.
SUBFRAME CONSTRUCTION.
APPLICATION FILED MAR. 23, 1921.

1,436,075.

Patented Nov. 21, 1922.
2 SHEETS—SHEET 1.

Witness
Edward T. Wray.

Inventors
William C. Anthony
Max Heinemann
by Parker & Carter
Attorneys

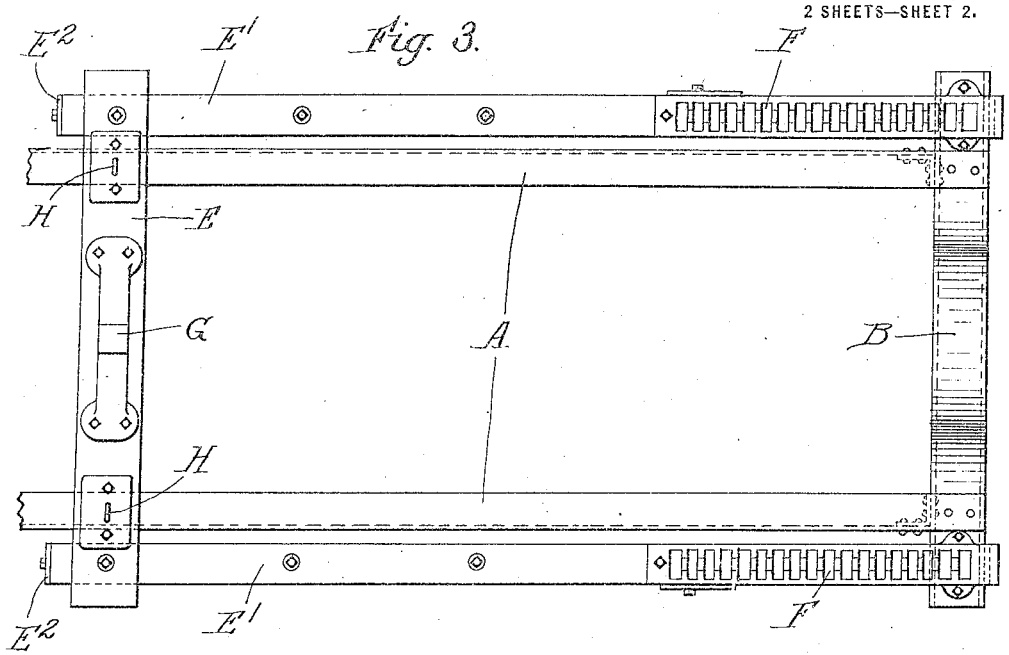
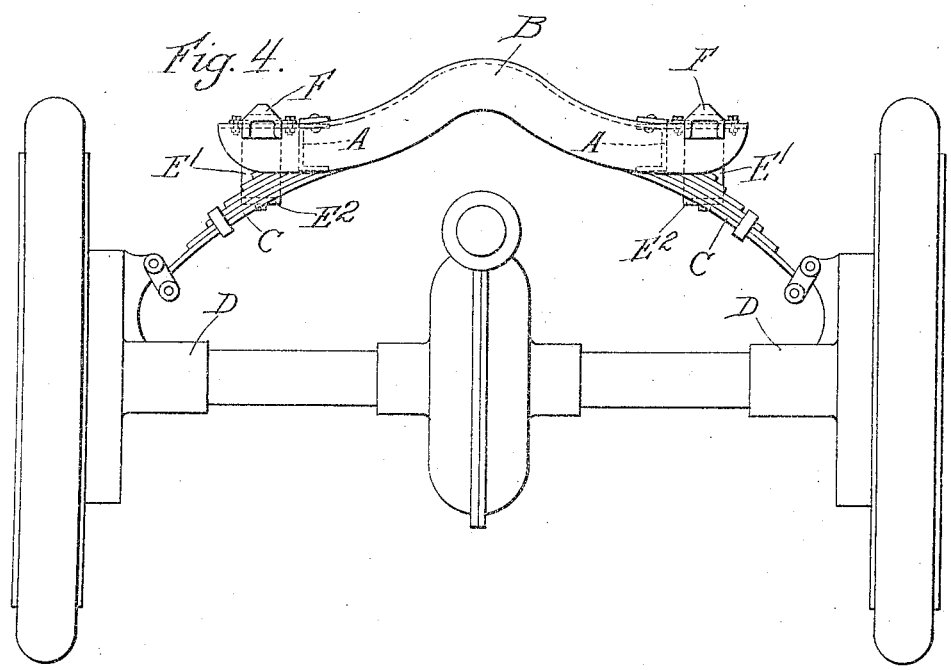

Patented Nov. 21, 1922.

1,436,075

UNITED STATES PATENT OFFICE.

WILLIAM C. ANTHONY AND MAX HEINEMANN, OF STREATOR, ILLINOIS, ASSIGNORS TO ANTHONY COMPANY, OF STREATOR, ILLINOIS, A CORPORATION OF ILLINOIS.

SUBFRAME CONSTRUCTION.

Application filed March 23, 1921. Serial No. 454,989.

*To all whom it may concern:*

Be it known that we, WILLIAM C. ANTHONY and MAX HEINEMANN, being citizens of the United States, and residents of Streator, in the county of La Salle and State of Illinois (whose post-office address is Streator, Illinois), have invented a certain new and useful Improvement in Subframe Constructions, of which the following is a specification.

This invention relates to dumping bodies and particularly to a frame for supporting the same. It has for one object to provide a supporting subframe construction which may be mounted upon a vehicle and upon which the various members which support the dumping body may be mounted so as to be held in proper space relation to each other. Another object is to provide a subframe construction which may be mounted upon the chassis of a vehicle so as to distribute the load of a dumping body to avoid undue strain on the chassis of the vehicle. Other objects will appear from time to time throughout the specification and claims.

The invention is illustrated more or less diagrammatically in the accompanying drawings, wherein—

Fig. 3 is a plan view of the subframe construction with body removed and parts broken away;

Fig. 4 is a rear view of the subframe construction with body omitted.

Like parts are designated by like characters throughout.

Figure 1:
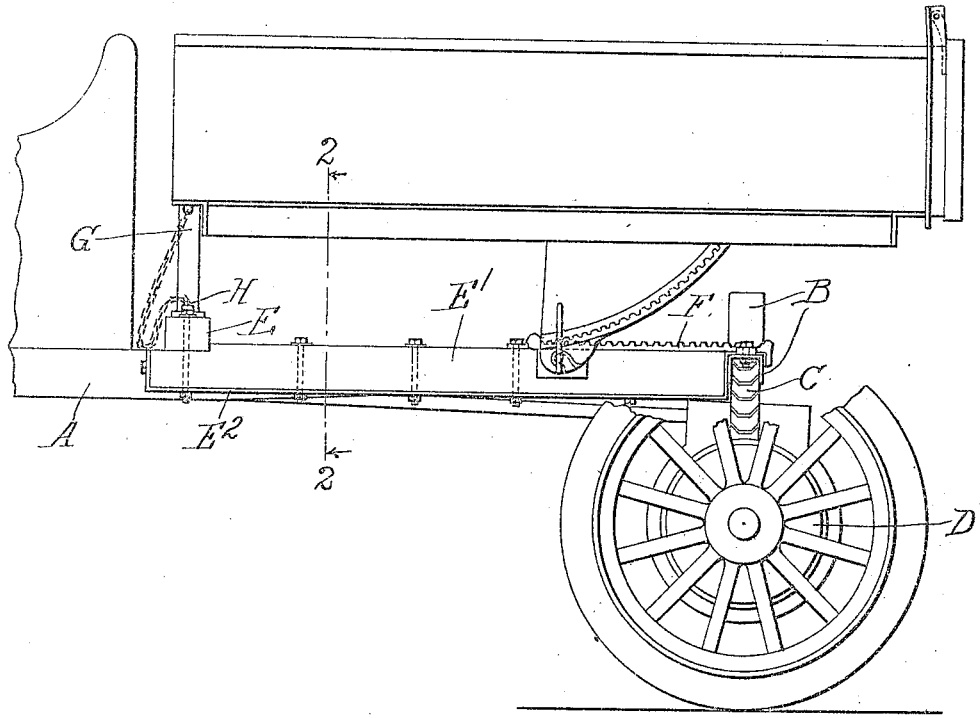
Fig. 1 is a side elevation of a motor truck with subframe construction in position.
Figure 2:
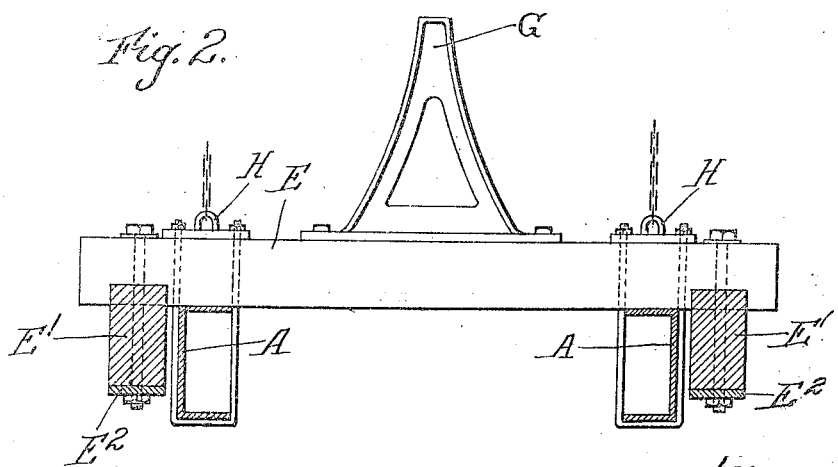
Fig. 2 is a vertical section on line 2—2 of Fig. 1 with the dumping body omitted.

A are the channel frame members of an automobile chassis. They are joined at the rear by the arched member B which carries the springs C to which is connected the axle housing D. Across the forward end of the chassis a heavy wooden piece E is laid. To it are bolted the side members E' E'. Along the bottom of the side members E' E' is fastened a metal strap E² which is adapted to serve as a tension member when the load is put upon the frame. These straps E² at the rear of the members E' are bent upwardly along the ends of the member B and extend rearwardly so as to overlie the ends of the member B. Mounted at the rear of each of the members E is the rack F which is adapted to cooperate with the toothed rocker upon which the dumping body is supported.

These racks extend rearwardly and overlie the rear end of the straps E² and rest upon the ends of the member B. On the forward frame member E is mounted the A frame G which may be bolted thereupon or secured in any other suitable manner. This A frame member is adapted to support the forward end of the dumping body when it is in a horizontal position. At either side of the A frame member G are fastened rings H. These are adapted to receive the ends of check chains which are secured to the body and are adapted to cushion the shock of its dump and to prevent it from moving too far to the rear. Details of these chains and their operation form no part of the present invention and are therefore not illustrated.

The use and operation of our invention are as follows:

Heretofore it has been the practice to mount the rack members which co-operate with the rocker on the dumping body directly on the chassis of the vehicle. The A frame member or any other member for supporting and locking the forward end of the body has also been separately mounted directly upon the chassis of the vehicle. In practice it has been found under certain circumstances that there is a slight tendency for the attachment of some of the members to loosen. This defect can of course readily be remedied by tightening the fastenings again, but in the hand of a careless operator, this may not be done, and thereupon there may be some movement of the members along the chassis, and the relation of the parts is thereby changed to such a degree as to make the operation less satisfactory. For example, the supporting and locking frame may be moved out of place to such an extent that the body when returning to the horizontal position is not locked automatically. One of the objects of the present invention is to make the body absolutely free from any such possible danger, in a word to make it as nearly fool proof as possible.

In order to avoid relative movement of any of the members of the dumping body assembly and in order better to distribute the weight of the body and its load upon the chassis frame, it has been found advisable to provide a subframe upon which all of the members of the body assembly may be rigidly mounted so that no possible relative movement may take place. By means of the present invention the weight of the body and its load is distributed largely throughout the chassis and not applied in such a manner as to cause undue strain upon the frame members of the chassis.

The subframe is assembled as shown and is mounted upon and secured to the chassis in any suitable manner. The A frame and rack members are then fastened to the subframe and the dumping body is positioned on the assembled parts.

We have shown an operative invention, still it will be obvious that many changes both of form, shape, and relation of parts may be made without departing materially from the spirit of our invention, and we wish there   that our showing be taken as in a sense   ammatical.

We claim—

1. In combination with a vehicle having a frame, a subframe incomplete in itself, detachably mounted upon and interlocking with and composed in part of said vehicle frame or chassis and wholly supported therefrom.

2. In combination with a vehicle having a frame, a subframe incomplete in itself, detachably mounted upon and interlocking with and composed in part of said vehicle frame or chassis and wholly supported therefrom, said subframe including a cross member and two longitudinal members attached each at one end to said cross member and at the other end supported from a component part of said vehicle frame.

3. In combination with a vehicle having a frame, a subframe incomplete in itself, detachably mounted upon and interlocking with and composed in part of said vehicle frame or chassis and wholly supported therefrom, said subframe including a cross member resting upon said vehicle frame and a pair of longitudinal members secured each at one end to said cross member, said longitudinal members provided with reinforcement, and by means of such reinforcement, supported at their other ends from a component part of said vehicle frame or chassis.

4. In combination a vehicle having a frame, including a cross member and a plurality of longitudinal members and a subframe composed in part of additional frame members in co-operation with said vehicle frame, said subframe comprising a cross member and a plurality of longitudinal members the cross member of said subframe resting upon the longitudinal members of said vehicle frame both the longitudinal members of said vehicle frame and the longitudinal members of said subframe supported at the rear from the cross member of said vehicle frame, and reinforcing members along the bottom of the longitudinal members of said subframe, constituting the connection between said longitudinal members and the cross member of the vehicle frame.

5. In combination a vehicle having a frame, a subframe supported therefrom and adapted to carry in fixed placed relation the supporting means for the dumping body, said frame comprising side members and a cross member, said member mounted on the frame of said vehicle, said side members supported from a cross member of said vehicle frame, metallic reinforcements along the bottom of each of said side members, said reinforcements bent upwardly about the rear of said members and across the cross member of said vehicle frame and secured thereto.

Signed at Streator, Illinois, this 2nd day of March, 1921.

WM. C. ANTHONY.
MAX HEINEMANN.

Witnesses:
CLAUS W. CARLSON,
KIRK B. SWEET.